United States Patent

[11] 3,590,164

[72] Inventor Bert F. Krauss
Westport, Conn.
[21] Appl. No. 746,169
[22] Filed July 19, 1968
[45] Patented June 29, 1971
[73] Assignee Litton Systems, Inc.
Beverly Hills, Calif.

[54] TRANSMISSION SYSTEM FOR TWO-LEVEL SIGNALS PROVIDING REDUCED BANDWIDTH REQUIREMENTS
6 Claims, 2 Drawing Figs.

[52] U.S. Cl. .......... 179/15.55 R, 178/7.1, 178/DIG. 3
[51] Int. Cl. .......... H04b 1/66, H04n 7/12
[50] Field of Search .......... 178/6, 6.8, 6 BWR, 7.1; 179/15.55, 15 BWR

[56] References Cited
UNITED STATES PATENTS
3,449,675 6/1969 Sekimoto .......... 325/38

*Primary Examiner*—Robert L. Richardson
*Attorneys*—Alan C. Rose and Alfred B. Levine

ABSTRACT: An electrical communication system wherein two-level analog signals, as in black-and-white or message facsimile, are converted into digital signals for transmission over a transmission channel. The input signal is sampled at twice its maximum frequency (Nyquist Rate) even though the bandwidth of the transmission channel limits the usable bit rate to a substantially lower value. The signal converter circuit employs perceptive coding of the signal to reduce the transmitted bit rate to a value consonant with the capacity of the channel without loss of pulses representing a line or space of one-half the resolution size. Thus the ideal sampling rate may be used where the transmission channel will not accommodate the corresponding bit rate of the digitalized signal.

| BINARY STATES OF | | | | | | | |
|---|---|---|---|---|---|---|---|
| Flip Flops | | | Gates | | | | Next Output of |
| 103 | 115 | 121 | 116 | 117 | 118 | 119 | FF 121 |
| 0 | 0 | 0 | 0 | 0 | 0 | 0 | 0 |
| 0 | 0 | 1 | 0 | 0 | 0 | 0 | 0 |
| 0 | 1 | 0 | 1 | 0 | 0 | 1 | 1 |
| 0 | 1 | 1 | 0 | 0 | 0 | 0 | 0 |
| 1 | 0 | 0 | 0 | 1 | 0 | 1 | 1 |
| 1 | 0 | 1 | 0 | 0 | 0 | 0 | 0 |
| 1 | 1 | 0 | 1 | 1 | 1 | 1 | 1 |
| 1 | 1 | 1 | 0 | 0 | 1 | 1 | 1 |

TRANSMISSION SYSTEM FOR TWO-LEVEL SIGNALS PROVIDING REDUCED BANDWIDTH REQUIREMENTS

BACKGROUND OF THE INVENTION

Field of the Invention

Digital encoding of two-level analog signals in facsimile telegraphy, where the sampling rate exceeds the maximum bit rate capacity of the transmission channel.

SUMMARY OF THE INVENTION

The object of this invention is to transmit intelligence represented by analog signals at greater fidelity or speed over a channel of limited bandwidth.

The analog signals are digitalized at twice their maximum frequency to avoid ambiguous outputs depending upon the time of occurrence of the sampling of the signal. Where the transmission capacity of the transmission channel cannot accept this bit rate, in accordance with the invention, perceptive coding is employed to convert the digitalized signals to a lower bit rate where the average rate of information is less than the sampling rate.

In facsimile transmission employing two-level (black-and-white) analog signals, perceptive coding employing three bits of storage, for example, eliminates ambiguities most frequently encountered in line drawings and similar copy. The results of two successive sampling bits are stored in a register and compared with a third stored bit previously transmitted. A decision is then made whether to next transmit a one or a zero over the transmission channel for the two stored bits, i.e., a one is transmitted if either of the stored bits is a one and the previously transmitted bit is a zero. The preceptive coding arrangement described eliminates the output ambiguities that would result from a lower sampling rate, such as half the Nyquist Rate.

DESCRIPTION OF THE PREFERRED EMBODIMENT

Figures 1, 2:
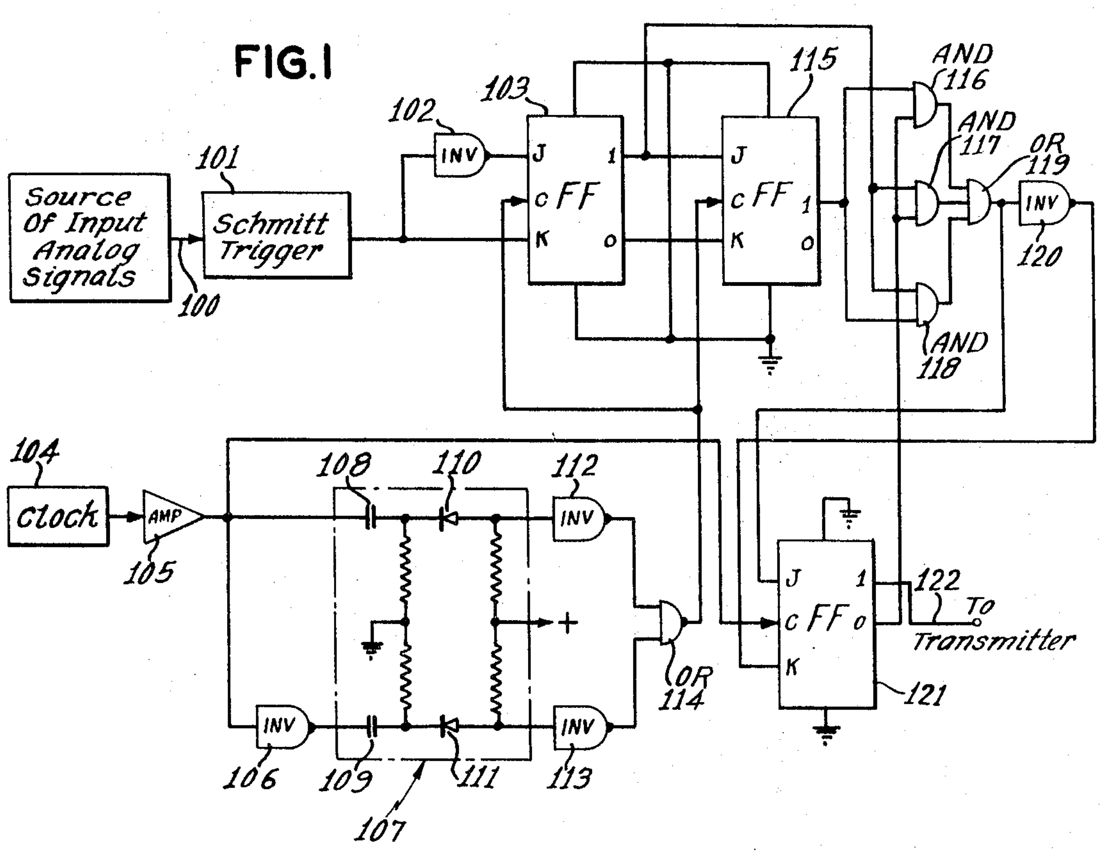
FIG. 1 is a schematic diagram of a transmission system according to the invention.
FIG. 2 is a truth table showing all possible states of the flip-flops and gates shown in FIG. 1 in binary notation, and the on-off binary coded output pulses.

In the system shown by way of example in FIG. 1, a source 100 of analog facsimile signals is connected to a threshold circuit 101, such as a Schmitt trigger. The analog signals may be assumed to be two-level or "balck-and-white" signals as would be obtained from the output of a facsimile scanner-transmitting line or message copy. If the signal level exceeds a preset threshold, the trigger circuit puts out a signal voltage representing "white" or binary 0. If the signal level is below the threshold value, the output of the trigger circuit is another signal voltage representing "black" or binary 1.

The output of the threshold circuit 101 is applied directly to a flip-flop 103 and through an inverter 102 thereto. Flip-flop 103 and is a standard J K flip-flop so that whenever a clock pulse is applied to input "C" the state of the flip-flop following the pulse will be 1 or 0 depending on whether the trigger circuit output level was 1 or 0 at the clock time.

In the system to be described, the perceptive coding technique requires that the analog input signal be sampled at twice the transmitting clock rate. A conventional data transmission system has available a square wave clock 104 whose frequency is equal to the transmission rate, or half the desired sampling rate. The clock pulses are generated either by the transmitting modem or a separate station clock oscillator.

The square wave clock signal from the clock 104 is impressed through an isolation amplifier 105 and inverter 106 to a differentiating circuit 107. The output of inverter 106 is a square wave 180° out of phase with the square wave obtained from amplifier 105. The two square waves are differentiated by capacitors 108 and 109, respectively, so that a positive or negative pulse is applied to the cathodes of diodes 110 and 111 whenever there is a transition of the square wave as in the conventional differentiating circuit. Due to the orientation and bias of the diodes only negative going pulses will be conducted through the diodes 110 and 111 to inverter amplifiers 1112 and 113. The input pulses to the inverters 112 and 113 will therefore occur alternately at times corresponding to each of the positive and negative transitions of the timing signal from the clock 104. The outputs of the inverters 112 and 113 are applied to a conventional OR gate 114. The output of the gate 114 is therefore a pulse stream at twice the frequency of the clock 104 and corresponds to the desired sampling rate.

The pulses generated by the gate 114 are used to sample and shift the input data from the trigger circuit 101 into a flip-flop 103. At the same time the previous sample already in flip-flop 103 is shifted into flip-flop 115 by the timing pulses from the gate 114.

Encoding AND gates 116, 117 and 118 and the OR gate 119 code the bits stored in flip-flops 103, 115 and 121 into the perceptive code desired. FIG. 2 is a truth table showing all the possible states of the flip-flops (output terminal 1) and gates in binary notation. The last column in the table labeled "next output of flip-flop 121" gives the resulting output signal to be transmitted over line 122 which is connected to the transmitter, not shown. This signal will be transmitted when the next clock signal at the transmitting rate from the amplifier 105 has shifted the coded signal from gate 119 and inverter 120 into the flip-flop 121. The output signal from the flip-flop 121 (output terminal) also becomes the input to the encoding gates 116 and 117 for the succeeding clock interval. It will be seen therefore that the output signal to the line 122 from the flip-flop 121 at half the sampling rate is coded so that each transmitted bit depends upon the comparison between the last two sampled bits and the "on" or "off" code of the previously transmitted bit; i.e., a 1 if the previous bit was a 0 and either of the last two bits was a 1, a 0 if the previous bit was a 1 and either of the last two bits was a 0, et cetera. Thus by a 3 bit simple storage arrangement of the digitalized signal, transmission may be effected at half the sampling rate without loss of pulses representing a line or space on the scanned copy of one-half the resolution size. This permits the utilization of a transmitting channel of limited bandwidth which would normally be unsatisfactory of the analog signal frequency or scanning rate desired or, conversely, the use of a higher scanning rate with an available channel.

It is to be understood that the foregoing description is by way of example and should not be considered as a limitation to the scope of the invention.

I claim:

1. A transmission system for two-level analog signals, comprising:

- means for converting input analog signals into digital code signals, including means for sampling said input signals at a sampling rate greater than the maximum transmission frequency of said system;
- means for storing said digital code signals;
- means for comparing two consecutive bits of said digital code signals;
- means controlled by said comparing means for transmitting bits, each representing said two consecutive bits; and
- said means controlled by said comparing means connected to said comparing means for providing a previous transmission bit for comparison against said two consecutive bits, whereby said transmission frequency required is reduced without a corresponding reduction in sampling rate.

2. A transmission system according to claim 1, in which the sampling rate is twice the transmission bit rate of the two-level analog signals, and the character of each bit transmitted (1 or 0) is determined by said comparing means after comparing said two consecutive bits and said previous transmission bit.

3. A transmission system according to claim 1, in which said digital code signal storing means continually stores two consecutive bits of the digitalized input signals and said means controlled by said comparing means continually stores one bit of the digitalized previous transmission bit.

4. A transmission system for two-level analog signals, comprising:

an output circuit;

an input circuit for converting input analog signals into digital code signals, including means for sampling said input signals at twice the maximum transmission frequency of said system;

flip-flop means for storing each input digital code signal and for storing the previously transmitted signal; and gating means for controlling said flip-flop means and for transmitting digital signals over said output circuit as determined by said stored input digital code signal and said stored previously transmitted signal, whereby said transmitting rate is less than the sampling rate.

5. A transmission system for two-level analog signals according to claim 4, wherein the output transmitting rate is equal to the sampling rate of the input analog signals.

6. A transmission system for two-level analog signals according to claim 4, wherein said flip-flop means include two flip-flop means for storing two consecutive bits of said digital code signal and one flip-flop means for storing said previously transmitted signal, and said gating means is connected to receive said stored signals and to control said one flip-flop means for selecting the signal to be transmitted over said output circuit.